United States Patent [19]
Paelian

[11] 3,915,248
[45] Oct. 28, 1975

[54] WEIGHING SYSTEM

[76] Inventor: Owen Paelian, P.O. Box 1435, Huntsville, Ala. 35807

[22] Filed: Jan. 10, 1975

[21] Appl. No.: 539,972

[52] U.S. Cl. .............................. 177/210; 177/255
[51] Int. Cl.² .................... G01G 3/14; G01G 21/06
[58] Field of Search ...... 177/210, 211, 255, DIG. 9; 73/141 A

[56] References Cited
UNITED STATES PATENTS
3,621,927  11/1971  Ormond ............................ 177/211

*Primary Examiner*—George H. Miller, Jr.

[57] ABSTRACT

A weighing system in which a force or weight is transmitted downward from a laterally stabilized weighing platform to a laterally stabilized load cell through a ball positioned between a concave region in a bottom end of the platform and a top end of the load cell.

3 Claims, 4 Drawing Figures

WEIGHING SYSTEM

BACKGROUND OF THE INVENTION

1. Field of the Invention

This invention relates to weighing systems, and particularly to an improved weighting system adapted to more accurately weigh large containers which are otherwise difficult to accurately weigh because of the presence of non-verticle forces on the weighing element.

2. General Description of the Prior Art

The applicant has found that present systems for weighing certain large bodies, particularly large chemical containers, fail to provide sufficient accuracy. Illustrative of the present art, FIGS. 1a and 1b show a typical system for combating the problem of reducing weighing errors due to "off-loading." As shown, a large tank 10 is supported by legs 12 which rest on load cells 14. More particularly, the problem is that because of transverse or lateral forces, the forces transmitted from base 16 of each of the tank supports are not transmitted vertically to load cells 14, thus the inaccuracies mentioned above. To attempt to alleviate this, stay rods 18 are coupled at one end 20 to each base 16 and are anchored at the other end to an anchor post 22. These rods assist in preventing bases 16 from departing from a level position and from shifting laterally and thus reduce the application of error producing lateral forces to load cells 14. Typically, tank 10 would contain some chemical, often corrosive, which dictates that the tank and all connecting members, including stay rods 18, be made of non-corrosive metal, such as stainless steel. This in turn results in stabilizing assemblies 24 being quite expensive. Further, experiences have indicated that they still do not sufficiently prevent the application of lateral forces to the load cells to provide the desired degree of accuracy and they need frequent tensioning.

Accordingly, it is the object of the present invention to provide an improved weighing system which eliminates the need for the stay rod assemblies and at the same time provides improved weighing accuracies.

SUMMARY OF THE INVENTION

In accordance with the invention, there would be provided an intermediate weighing platform between each support point of the object to be weighed and each supporting load cell. The top of each of the platforms would be rigidly connected to the support point and would include thereunder a diaphragm constrained force transmission member. A central bottom portion of the platform would contain a concave region as would a top portion of a diaphragm constrained load cell. Force coupling between the intermediate platform and the load cell would be by means of a ball. The ball would have a spherical curvature less than the curvature of the concave surfaces between which it rests.

DETAILED DESCRIPTION OF THE DRAWINGS

Figure 2:
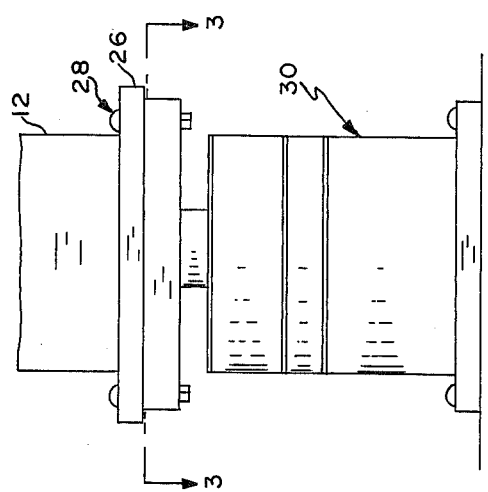
FIG. 2 is a side view of an embodiment of the invention.

In accordance with the present invention, a weighing assembly would be of the general configuration shown in FIG. 2, being adapted to be attached to a mounting plate 26 by means of bolt assemblies 28.

Figure 3:
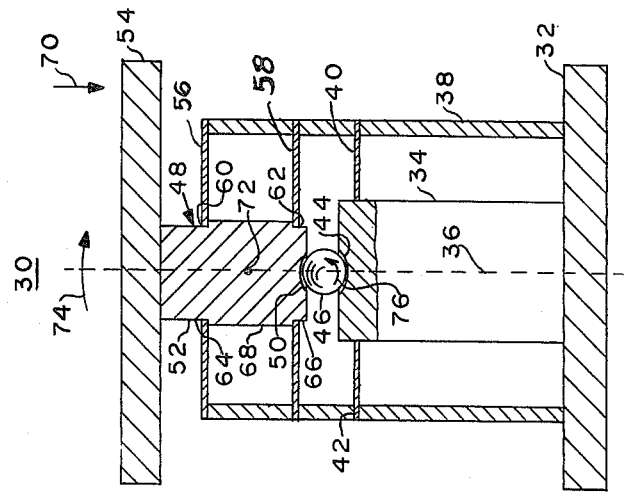
FIG. 3 is a sectional view along lines 3—3 of FIG. 2.

FIG. 3 shows a sectional view of FIG. 2, and, as shown, weighing assembly 30 includes a lower mounting plate 32 upon which a conventional load cell or electrically responsive weighing element 34 is supported. Such weighing elements are adapted to provide extremely accurate indications of force applied along the axis 36 of the element but are subject to error when there are present forces which are applied at some angle with respect to axis 36. An outer, cylindrical stabilizing support member 38 is rigidly attached to lower mounting plate 32. The top region of load cell 34 is concentrically supported by an inner edge of diaphragm 40, the outer rim 42 of the diaphragm being secured to cylindrical support 38. A spherical socket 44 is centrally formed in the upper end of load cell 34 and is adapted to freely accept a ball 46, the socket being of a slightly larger curvature than ball 46. Ball 46 couples the upper end of load cell 34 to coupling assembly 48 through a similar spherical-shaped socket 50 formed in the bottom of load post 52. Load post 52 is centrally attached to upper mounting plate 54 and is laterally supported by cylindrical support member 38 through upper and lower diaphragms 56 and 58. The diaphragms have central openings 60 and 62 which are closely secured to outer reduced regions 64 and 66 of load post 52 and are thus spaced apart by intermediate region 68 extending between the diaphragms.

Assuming now that an off-center loading force is applied as illustrated by arrow 70, this will cause the left region of upper diaphragm 56 to be in tension nand the right-hand region of lower diaphragm 58 to be in tension, and in this manner load post 52 is maintained essentially vertically and thus essentially only vertical forces are transmitted downward to ball 46 and therefrom to load cell 34. However, some significant torsional forces will be present and effective and will provide some rotational force about a horizontal axis of the diaphragm supported load post 52, which axis is approximately illustrated as passing through the paper at point 72. This torsional force will result in some rotation of load post 52, as indicated by arrow 74, about axis 72. This in turn causes load post 52 to rotate ball 46 slightly as shown by arrow 76 and to displace ball 46 slightly to the left, rolling on the upper concave surface 50 of load cell 44. This rotation is in lieu of applying a force to the left of load cell 34. Because of the geometry, ball 46 may not actually be rotated to transmit substantially axial forces. To the extent that any slight lateral force is still applied and some off-axis loading is directed to load cell 34, diaphragms 56 and 58 quite effectively reduce this force to essentially a negligible quantity.

Figure 1A:
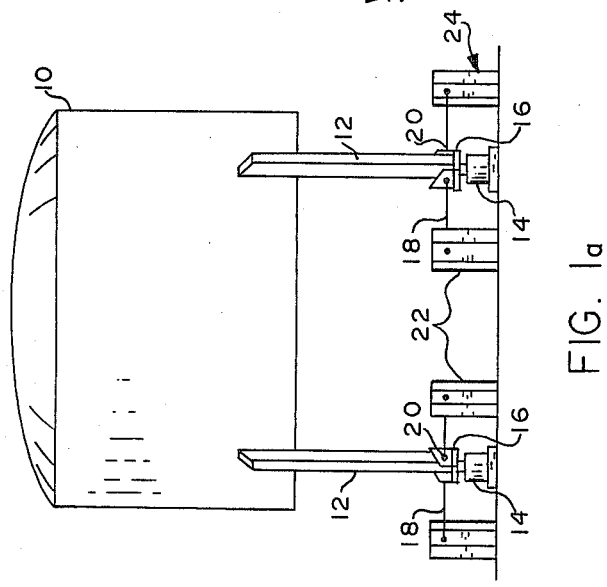
FIG. 1a is a side view of a typical storage tank and weighing element adapted to weight it.
Figure 1B:
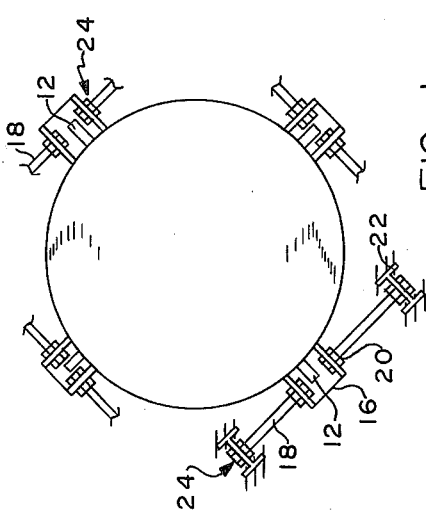
FIG. 1b is a plan view of a storage tank with the weighing element stabilized in accordance with a prior art method.

The net result of the configuration as described is that weighing accuracy is improved over that achieved by the conventional configuration illustrated in FIGS. 1a and 1b and at the same time there is eliminated the costly stabilizing assemblies employed in such a system.

What is claimed is:

1. A weighing system comprising:

a mounting base;

weight sensing means having a bottom portion supported by said mounting base and a top portion having a concave top region adapted to receive vertically downward forces, and said weight sensing means including means for providing an electrical output responsive to said forces;

a weighing platform adapted to be rigidly connected to a body to be weighed;

force transmission means for coupling said weighing platform to said weight sensing means comprising:
  a vertically positioned force coupling member, a top portion of which is attached to said weighing platform and a bottom portion of which includes a concave region facing said concave region of said weight sensing means, and
  a ball positioned to contact and rest between said concave regions of said weighing platform and said weight sensing means, whereby forces transmitted by said weighing platform passes through said ball;

stabilizing means comprising:
  a support member supported by said mounting base,
  first diaphragm means connecting said weight sensing means to said support means for laterally stabilizing said weight sensing means, and
  second diaphragm means connecting said force transmission means and said support means for laterally stabilizing said force transmission means;

whereby transmission of non-vertical forces to said weight sensing means is substantially attenuated.

2. A weighing system as set forth in claim 1 wherein the degree of curvature of said concave regions is less than that of said ball.

3. A weighing system as set forth in claim 2 wherein said support member is cylindrical and extends upward and around said weight sensing means and said force transmission means, and said second diaphragm means comprises a pair of diaphragms interconnecting said support member to and said force transmission means.

* * * * *